Aug. 26, 1958     W. T. DOWNING     2,849,081
AIR PURIFIER
Filed May 10, 1957
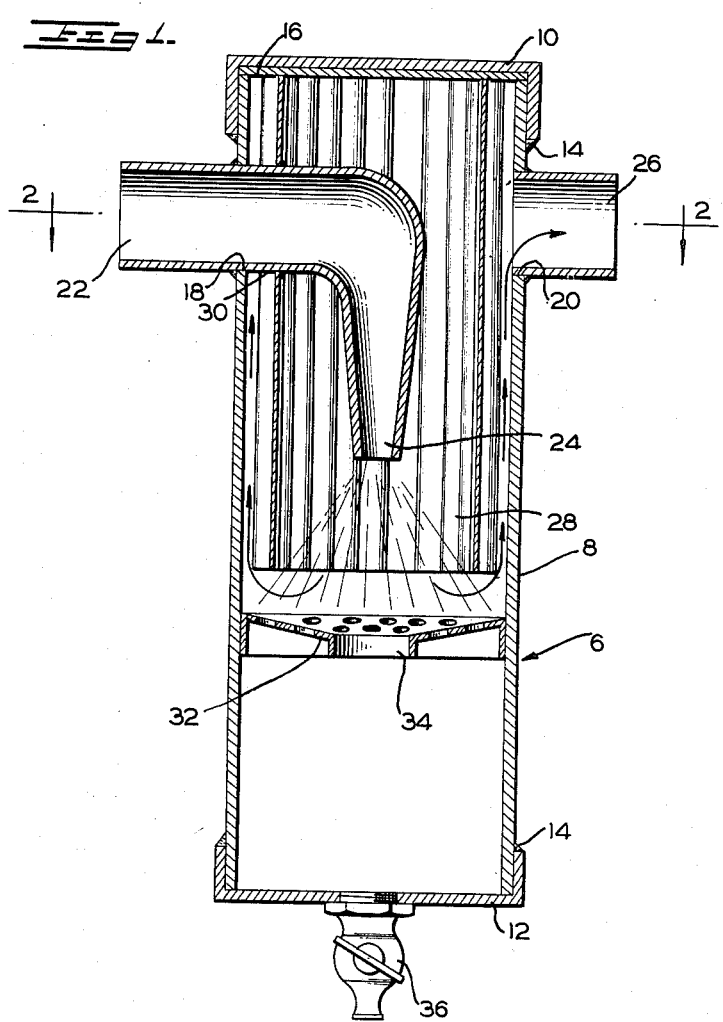
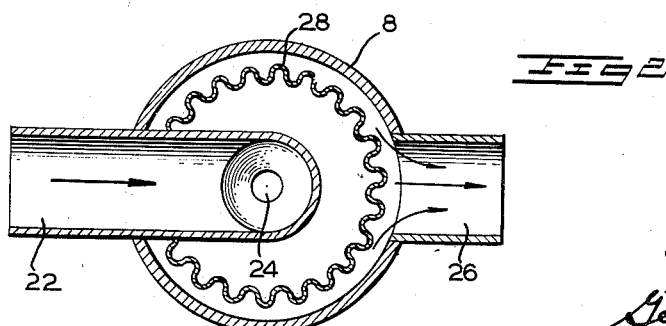
INVENTOR
WILLIS T. DOWNING
BY
ATTORNEY

United States Patent Office 2,849,081
Patented Aug. 26, 1958

2,849,081

AIR PURIFIER

Willis T. Downing, Alexandria, Va.

Application May 10, 1957, Serial No. 658,472

3 Claims. (Cl. 183—113)

(Granted under Title 35, U. S. Code (1952), sec. 266)

The invention described herein may be manufactured and used by or for the Government of the United States of America for governmental purposes without the payment of any royalties thereon or therefor.

This invention relates to a moisture separator and more particularly to a device adapted to separate water and/or dirt from air as it flows through an air line.

In the operation of equipment utilizing air under pressure or in any situation where an air supply is a necessity, it is necessary that moisture and/or dirt be removed from the air in order to prevent malfunctioning of the equipment due to blockage of air-flow. A prior art approach to this problem utilizes a separator in the air line, said separator usually consisting of a device having means on the inside thereof adapted to spin the air as it passes therethrough, thereby removing moisture and dirt by centrifugal force. Such devices usually have such a relation between the inlet area, the outlet area and the area through the body of the device that the air expands which in turn reduces the velocity of flow. The resulting slow rate of air flow through the separator results in a decreased rate of moisture separation.

Accordingly it is an object of this invention to provide an air purifier adapted to overcome the deficiencies of the prior art devices, as enumerated above.

A further object of this invention is to provide an air purifier that is adapted for use in an air line and that will remove slugs of water and dirt, such as scale, sediment or the like from the air.

Still another object of this invention is to provide an air purifier with means whereby the velocity of flow of the air is not slowed due to expansion within said purifier.

Still an additional object of this invention is to provide an air purifier with means adapted to accelerate the flow of air therethrough.

The moisture separator, or air purifier, produced in accordance with this invention consists of a cylindrical member having an air inlet tube and an air outlet tube, said inlet tube having a downwardly directed elbow at the innermost end thereof and a nozzle at the lower extremity of said elbow. Air is adapted to flow through said nozzle and into the cylindrical member. The cylindrical member is also provided with an air deflecting means opposite the nozzle and with means for reversing the flow of air through the moisture separator prior to its passage through the air outlet tube. A means is also provided for draining off fluid as it accumulates in the separator.

Other objects and many of the attendant advantages of this invention will be readily appreciated as the same becomes better understood, by reference to the following detailed description when considered in connection with the accompanying drawing wherein:

Fig. 1 is an elevational, sectional view of a preferred embodiment of the invention; and Fig. 2 is a sectional view taken on line 2—2 of Fig. 1.

Referring now to the drawing wherein like reference characters designate like or corresponding parts throughout the several views, there is illustrated in Fig. 1 a moisture separator 6 that includes a cylindrical body portion 8.

The opposite ends of the cylindrical member 8 are closed by cap members 10 and 12, each of which is affixed to said cylindrical member 8 in air-tight relation therewith, as for example by welding 14. A gasket 16 is located between the under surface of the cap 10 and the upper edge of the cylindrical member 8 to further insure an air-tight seal at said end.

The cylindrical member 8 is provided with an inlet opening 18 and an outlet opening 20. An air inlet tube 22 is fixedly mounted in the inlet opening 18 in air-tight relation with said opening. The tube 22 is provided with a right angle bend, or elbow, located within the separator 6. The innermost end of the right angular tube 22 is provided with a nozzle portion 24, whereby the flow of air is accelerated as it enters the separator. It is preferred that the angle of divergence of the nozzle, portion 24, be of the venturi design so as to create laminar flow without turbulence. An air outlet tube 26 is fixedly mounted in the outlet opening 20 by means adapted to render the fit between said tube and said opening air-tight.

A cylindrical, corrugated member 28 is fixedly mounted within the housing 8, in spaced relation with the sides thereof. The corrugated member 28 is provided with a hole 30 through which the air inlet tube 22 extends, said tube being fixedly mounted in said hole 30 in air-tight relation therewith. The corrugated cylinder 28 is so dimensioned and located within the housing 8 that its upper edge is in air-tight contact with the underside of the gasket 16. A perforated air-deflection plate 32 is fixedly mounted between the walls of the separator 8, and opposite the nozzle 24.

In operation, the moisture separator 6 receives air under pressure through the air inlet tube 22, the air in turn flowing through the nozzle 24, whereby the speed of flow is accelerated. The accelerated stream of air strikes the deflection plate 32 and in so doing, at least a portion of the moisture and/or dirt therein is removed. After the separator becomes filled with air, flow commences out of the container. The air passes between the outer surface of the corrugated member 28 and the inner surface of the cylindrical member 8, and thence through the outlet tube 26.

It is pointed out that the air must of necessity flow between the corrugated member 28 and the outer cylindrical member 8 by virtue of the fact that all openings between the interior of said corrugated member and the shell 8 are sealed in air-tight condition. Thus the air, in flowing through the separator 6, must follow a circuitous path and the resultant reversal of flow causes a removal of moisture therefrom by virtue of centrifugal force; said removal being in addition to that brought about by impingement of the air on the deflector plate 32.

It is further pointed out that the corrugated member 28 serves as a cooling member upon which moisture is condensed from the air, and of course by making said member of corrugated material the condensing area is appreciably increased.

The lower end of the moisture separator 26 is provided with a drain valve 36, whereby accumulated moisture in the bottom of the separator may be removed.

In summation, it is pointed out that the instant invention has greater moisture and/or dirt removing capacity than the prior art devices by virture of the air flow accelerating nozzle 24, the deflector plate 32 and the corrugated tubular member 28, the latter being so arranged within the separator that the air must follow a circuitous path through said separator; the latter feature causes removal of moisture and/or dirt by means of the centrifugal force applied to the air, and also by acting as a moisture condensing surface.

Obviously many modifications and variations of the present invention are possible in light of the above teachings. It is therefore to be understood that within the scope of the appended claims the invention may be practiced otherwise than as specifically described.

What is claimed is:

1. A moisture separator of the class described comprising a hollow container, a tubular member formed of corrugated material fixedly mounted within said hollow container, in spaced relation with the inner wall of said container, an air inlet tube extending through the wall of said container and through said tubular member in air-tight relation with each, said inlet tube having a nozzle member at the discharge end thereof within said tubular member, an air deflection plate mounted within said separator opposite the discharge end of said nozzle, an air outlet tube extending through the wall of said outer container only, in air-tight relation therewith, whereby outwardly flowing air must move between the outer wall of said tubular member and the inner wall of said outer container and thence through said outlet tube.

2. An air purifier of the class described comprising, a hollow container, a tubular member formed of corrugated material fixedly mounted within said container in spaced relation with the inner wall of said container, a horizontal air inlet tube extending through the wall of said container and through said tubular member in air-tight relation with each, said inlet tube having a downwardly bent portion within said tubular member, and terminating in a nozzle member at the discharge end thereof, an air deflection plate mounted within said purifier opposite the open end of said nozzle, a horizontal air outlet tube extending through the wall of said outer container only and being on the same horizontal axis as said inlet tube, whereby outwardly flowing air must flow between the outer wall of said corrugated tubular member and the inner wall of said container and thence through said outlet tube.

3. An air purifier set forth in claim 2, wherein said air deflection plate is fixedly mounted on the inner wall of said outer container and in spaced relation from one end of said tubular member.

References Cited in the file of this patent

UNITED STATES PATENTS

| | | |
|---|---|---|
| 1,899,993 | Spencer | Mar. 7, 1933 |
| 2,336,430 | Wery | Dec. 7, 1943 |
| 2,672,950 | Leiman | Mar. 23, 1954 |

FOREIGN PATENTS

| | | |
|---|---|---|
| 517,774 | Great Britain | Feb. 8, 1940 |
| 628,501 | France | June 28, 1927 |
| 1,093,676 | France | Nov. 24, 1954 |